(12) United States Patent
Nishimiya

(10) Patent No.: US 12,544,873 B2
(45) Date of Patent: Feb. 10, 2026

(54) AUTOMATIC JIG REPLACEMENT SYSTEM

(71) Applicant: KITAGAWA IRON WORKS CO., LTD., Fuchu (JP)

(72) Inventor: Tamio Nishimiya, Fuchu (JP)

(73) Assignee: KITAGAWA IRON WORKS CO., LTD., Hiroshima (JP)

( * ) Notice: Subject to any disclaimer, the term of this patent is extended or adjusted under 35 U.S.C. 154(b) by 387 days.

(21) Appl. No.: 18/249,820

(22) PCT Filed: Oct. 25, 2021

(86) PCT No.: PCT/JP2021/039213
§ 371 (c)(1),
(2) Date: Apr. 20, 2023

(87) PCT Pub. No.: WO2022/091994
PCT Pub. Date: May 5, 2022

(65) Prior Publication Data
US 2023/0381907 A1    Nov. 30, 2023

(30) Foreign Application Priority Data

Oct. 29, 2020 (JP) ................................. 2020-181076

(51) Int. Cl.
*B23Q 17/24* (2006.01)
*B25J 9/16* (2006.01)

(52) U.S. Cl.
CPC ........ *B23Q 17/2428* (2013.01); *B25J 9/1679* (2013.01)

(58) Field of Classification Search
CPC ............... B23Q 17/2428; B23B 31/39; B23B 31/16279; B23B 2260/016;
(Continued)

(56) References Cited

U.S. PATENT DOCUMENTS

2009/0143206 A1    6/2009 Terazono et al.
2011/0115171 A1    5/2011 Van De Vosse et al.
(Continued)

FOREIGN PATENT DOCUMENTS

CN    101444848 A    6/2009
CN    103252644 A    8/2013
(Continued)

OTHER PUBLICATIONS

International Search Report issued on Nov. 16, 2021, in corresponding International Application No. PCT/JP2021/039213; 6 pages.
(Continued)

*Primary Examiner* — An H Do
(74) *Attorney, Agent, or Firm* — Maier & Maier, PLLC

(57) ABSTRACT

An automatic jig replacement system includes a detection device, a robot, a bolt tightening/loosening device, and a control device. The detection device is configured to be capable of detecting a predetermined part of a jig. The robot is configured to be capable of conveying the jig. The bolt tightening/loosening device is configured to be capable of tightening/loosening a bolt for securing the jig. The control device determines a bolt tightening/loosening position, on the basis of a result of detecting the predetermined part by the detection device. The robot is caused to unload the jig from the mounting position, or to load the jig to the mounting position. The bolt tightening/loosening device is moved to the bolt tightening/loosening position, and is caused to tighten or loosen the bolt.

11 Claims, 19 Drawing Sheets

(58) Field of Classification Search
CPC ............... B23B 2270/48; B25J 9/1679; G05B 2219/50132; G05B 2219/50099; G05B 2219/50122; G05B 2219/45091; G05B 2219/50125

See application file for complete search history.

(56) References Cited

U.S. PATENT DOCUMENTS

| | | |
|---|---|---|
| 2013/0218324 A1 | 8/2013 | Furuya |
| 2017/0113390 A1 | 4/2017 | Asaoka |
| 2018/0297717 A1 | 10/2018 | Haldimann |

FOREIGN PATENT DOCUMENTS

| | | |
|---|---|---|
| CN | 106608033 A | 5/2017 |
| CN | 107812971 A | 3/2018 |
| CN | 108698178 A | 10/2018 |
| CN | 109277849 A | 1/2019 |
| CN | 209830916 U | 12/2019 |
| FR | 2956993 A1 | 9/2011 |
| JP | S60255302 A | 12/1985 |
| JP | H05050385 A | 3/1993 |
| JP | H07108426 A | 4/1995 |
| JP | 2002205288 A | 7/2002 |
| JP | 2017080929 A | 5/2017 |
| JP | 2018075695 A | 5/2018 |
| JP | 2019034384 A | 3/2019 |
| TW | M460865 U | 9/2013 |
| WO | 2017145349 A1 | 8/2017 |

OTHER PUBLICATIONS

Extended Search Report issued on Mar. 22, 2024, in corresponding European Application No. 21886112.8, 10 pages.

Office Action issued on Apr. 8, 2024, in corresponding Taiwanese Application No. 110139441, 12 pages.

Office Action issued on Aug. 9, 2025, in corresponding Chinese Application No. 202180070942.5, 14 pages.

Office Action issued on Jan. 5, 2026, in corresponding European Application No. 21886112.8, 10 pages.

Xu et al., "A Review on Significant Technologies Related to the Robot-Guided Intelligent Bolt Assembly Under Complex or Uncertain Working Condition", IEEE Access, Sep. 17, 2019, vol. 7, pp. 136752-136776.

Lara et al., "Automated Robot-Based Screw Insertion System", IECON '98. Proceedingn of the 24th Annual Conference of the IEEE Industrial Electronics Society, Aug. 31-Sep. 4, 1998, pp. 2440-2445.

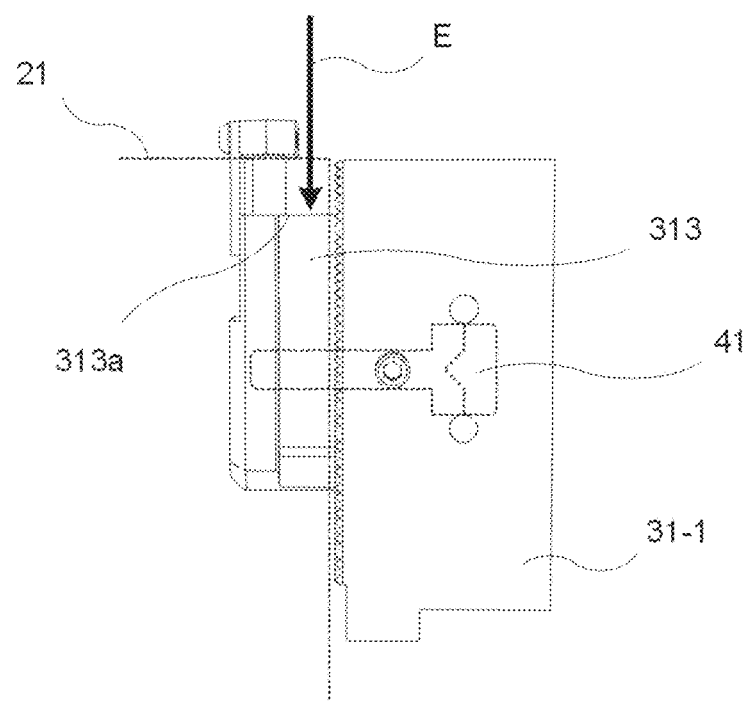

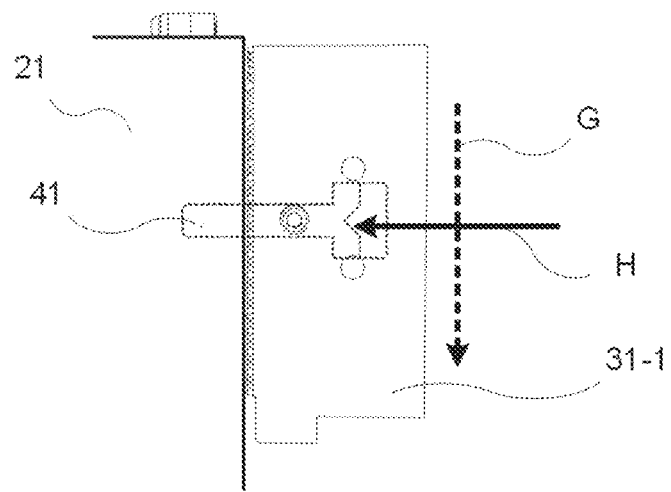

AUTOMATIC JIG REPLACEMENT SYSTEM

FIELD

The present invention relates to an automatic jig replacement system.

BACKGROUND

A machine tool is mounted with a predetermined jig in accordance with a workpiece to be machined. Patent Document 1 discloses a chuck that grips a workpiece at a front of a body. For such a chuck, a top jaw, which is a jig, needs to be replaced according to the workpiece.

Patent Document

[Patent Document 1] JP 2019-034384 A

SUMMARY

Yet, there is a demand for automatic jig replacement. To perform jig replacement automatically, a working apparatus such as a robot arm may be used. For example, when a bolt tightening/loosening apparatus is used as a working apparatus, it is necessary to specify a position of a bolt. However, the position of the bolt may differ depending on shape of the jig designed according to the workpiece, and even if the shape of the jig is the same, the position of the bolt may differ if a mounting position is different.

Therefore, it has been difficult for a working apparatus to automatically perform bolt tightening/loosening for various types of jigs corresponding to various works.

In view of such circumstances, the present invention provides an automatic jig replacement system capable of grasping a bolt tightening/loosening position of a jig and automatically performing jig replacement.

According to an aspect of the present invention, there is provided an automatic jig replacement system capable of automatically replacing a jig that is mounted on a mounting position of a machine tool by bolt tightening/loosening. The automatic jig replacement system comprises a detection apparatus, a robot, a bolt tightening/loosening apparatus, and a control apparatus. The detection apparatus is configured to detect a predetermined portion of the jig. The robot is configured to transport the jig. The bolt tightening/loosening apparatus is configured to tighten/loosen a bolt that fixes the jig. The control apparatus is configured to determine a bolt tightening/loosening position based on a detection result of the predetermined portion by the detection apparatus. The control apparatus is configured to allow the robot to carry the jig out of the mounting position or to carry the jig into the mounting position. Further, the control apparatus is configured to allow the bolt tightening/loosening apparatus to move to the bolt tightening/loosening position and allow the bolt tightening/loosening apparatus to perform tightening/loosening of the bolt.

According to an aspect of the present invention, the bolt tightening/loosening position is determined by detecting the predetermined portion of the jig, and the bolt tightening/loosening apparatus is allowed to move to a determined bolt tightening/loosening position to perform tightening/loosening of the bolt. Therefore, even if the bolt tightening/loosening position of the jig is not constant, the jig can be replaced automatically.

BRIEF DESCRIPTION OF DRAWINGS

FIG. 6A is a diagram showing a left side of a replacement jaw 31-1 when the replacement jaw 31-1 is mounted on a chuck 21.

FIG. 8B is a diagram showing a left side of a replacement jaw 31-1 when the replacement jaw 31-1 is mounted on a chuck 21.

DETAILED DESCRIPTION

Hereinafter, embodiment of the present invention will be described with reference to the drawings. Various features described in the embodiment below can be combined with each other.

A program for realizing a software may be provided as a non-transitory computer readable medium that can be read by a computer or may be provided for download from an external server or may be provided so that the program can be activated on an external computer to realize functions thereof on a client terminal (so-called cloud computing).

Further, the "portion/unit" may include, for instance, a combination of hardware resources implemented by a circuit in a broad sense and information processing of software that can be concretely realized thereby these hardware resources. Further, various information is performed in the present embodiment, and the information can be represented by, for instance, physical values of signal values representing voltage and current, high and low signal values as a set of binary bits consisting of 0 or 1, or quantum superposition (so-called qubits), and communication/calculation can be performed on a circuit in a broad sense.

Furthermore, the circuit in a broad sense is a circuit realized by combining at least an appropriate number of a circuit, a circuitry, a processor, a memory, or the like. In other words, it is a circuit includes application specific integrated circuit (ASIC), programmable logic device (e.g., simple programmable logic device (SPLD), complex programmable logic device (CPLD), field programmable gate array (FPGA)), or the like.

1. Configuration Example

Figure 1:
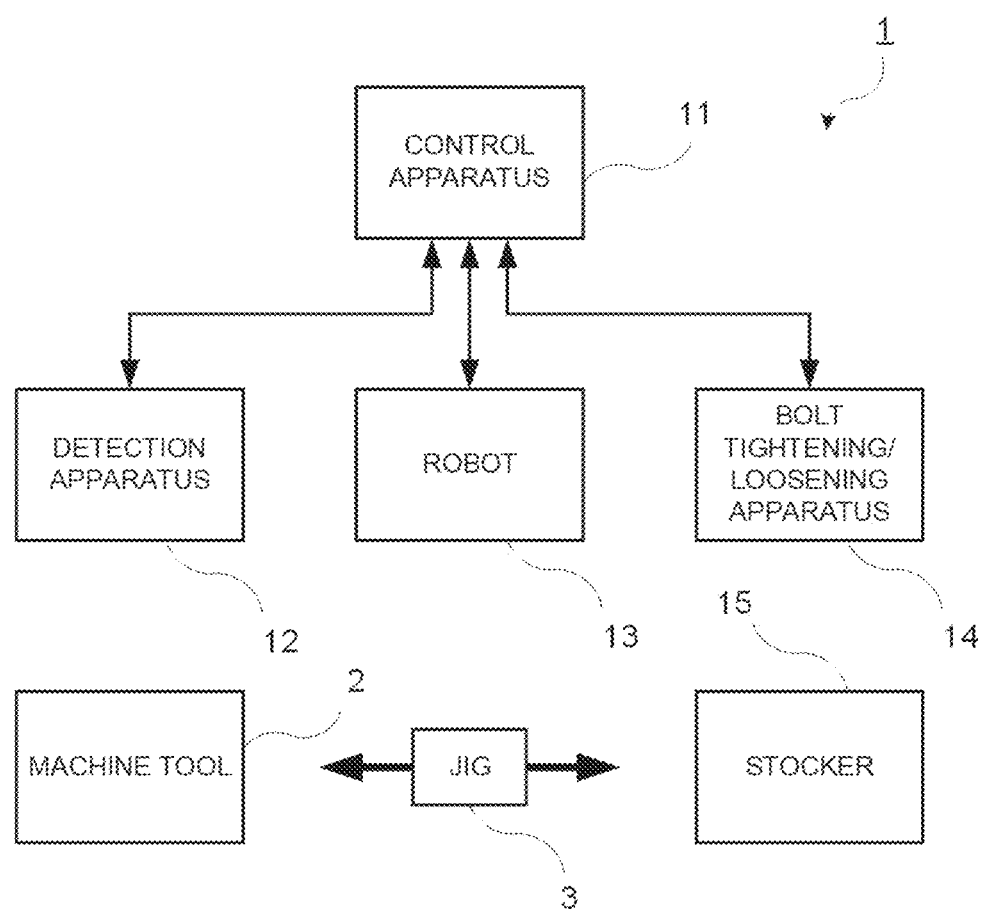
FIG. 1 is a diagram showing a configuration of an automatic jig replacement system 1 according to an embodiment of the present invention.

FIG. 1 is a diagram showing a configuration of an automatic jig replacement system 1 according to an embodiment of the present invention. As shown in the drawing, the automatic jig replacement system 1 comprises a control apparatus 11, a detection apparatus 12, a robot 13, a bolt tightening/loosening apparatus 14, and a stocker 15. The automatic jig replacement system 1 is capable of automatically replacing a jig 3 that is mounted on a mounting position of a machine tool 2 by bolt tightening/loosening. The machine tool 2 is, for example, a chuck, which is a fixture fixed to a machining center or a 5-axis machine. The chuck is configured in such a manner that at least a top jaw is mounted as a jig on a master jaw that is provided on the chuck. Further, the fixture is configured in such a manner that at least a top jaw is mounted as a jig.

The control apparatus 11 is configured to determine a bolt tightening/loosening position based on a detection result of a predetermined portion by the detection apparatus 12. The predetermined portion is a portion with some characteristic that is effective when determining the bolt tightening/loosening position and is a part of the jig 3 or a tightening tool or the like comprised in the jig 3. For example, the predetermined portion is an end face of a T-nut comprised in the jig 3, a convex or a concave provided on a side of the jig 3, a tool hole for tightening/loosening provided on a bolt tightening the jig 3, a head of a bolt tightening the jig 3, or the like. Details regarding the predetermined portion will be described later.

The control apparatus 11 is configured to allow the robot 13 to carry the jig 3 out of the mounting position or to carry the jig 3 into the mounting position. The mounting position is a portion of the machine tool 2 where the jig 3 is mounted. Furthermore, the control apparatus 11 is configured to allow the bolt tightening/loosening apparatus 14 to move to the bolt tightening/loosening position and allows the bolt tightening/loosening apparatus 14 to tighten/loosen a bolt. The bolt is used for fixing the jig 3 to the machine tool 2, and the bolt tightening/loosening position is a position where the bolt is tightened/loosened.

The control apparatus 11 may be configured as the same apparatus as the control apparatus (not shown) that controls operation of the machine tool 2, or may be configured to operate in cooperation with the control apparatus.

The detection apparatus 12 is configured to detect a predetermined portion of the jig 3. One or more detection apparatuses 12 are arranged in the automatic jig replacement system 1. Moreover, the detection apparatus 12 may be comprised in at least one of the stocker 15 and the machine tool 2, or may be comprised in the robot 13. Of course, it may be installed independently of the stocker 15, the machine tool 2, or the robot 13 as well.

The detection apparatus 12 is, for instance, a displacement meter or a laser displacement meter that detects a position of the T-nut when the predetermined portion to be detected is the end face of the T-nut comprised in the jig 3. When the predetermined portion to be detected is a convex or a concave provided on a side of the jig 3, the detection apparatus 12 is any one of a laser displacement meter, a two-dimensional laser displacement meter, and a proximity sensor that detects a position of the convex or the concave. When the predetermined portion to be detected is a tool hole for tightening/loosening provided on the bolt tightening the jig 3, the detection apparatus 12 is any one of a laser displacement meter, a two-dimensional laser displacement meter, a camera, and a three-dimensional scanner that detects a position of the tool hole. When the predetermined portion to be detected is a head of the bolt tightening the jig 3, the detection apparatus 12 is any one of a laser displacement meter, a two-dimensional laser displacement meter, a camera, and a three-dimensional scanner that detects a position of the head.

The robot 13 is configured to transport the jig 3. Specifically, the robot 13 is configured to grasp the jig 3, such as a hand, and carry the jig 3 out of the mounting position of the machine tool 2 to a housing position provided in the stocker 15, or carry the jig 3 from the housing position into the mounting position. The automatic jig replacement system 1 may comprise a plurality of robots 13. Type of the robot 13 may be a robot arm or a gantry robot. Of course, other types may be applied as well.

The bolt tightening/loosening apparatus 14 is configured to tighten/loosen a bolt that fix the jig 3. The bolt tightening/loosening apparatus 14 may be provided integrally with the robot 13.

The stocker 15 is configured to house the jig 3 in the housing position. Of course, the stocker 15 may house two or more jigs 3. The stocker 15 may be installed on floor, etc., and may be a movable type that can be moved, such as a rotating type, or a fixed type that is fixed to floor, etc. When the stocker 15 is a fixed type, it is unnecessary to tighten the jig 3 by bolting when the jig 3 is housed in the housing position, but when the stocker 15 is a movable type, it is preferable to fix the jig 3 by bolting when the jig 3 is housed in the housing position for safety reason. Of course, it can be arbitrarily decided whether or not to fix the jig 3 to the stocker 15.

2. Predetermined Portion

Figure 2:
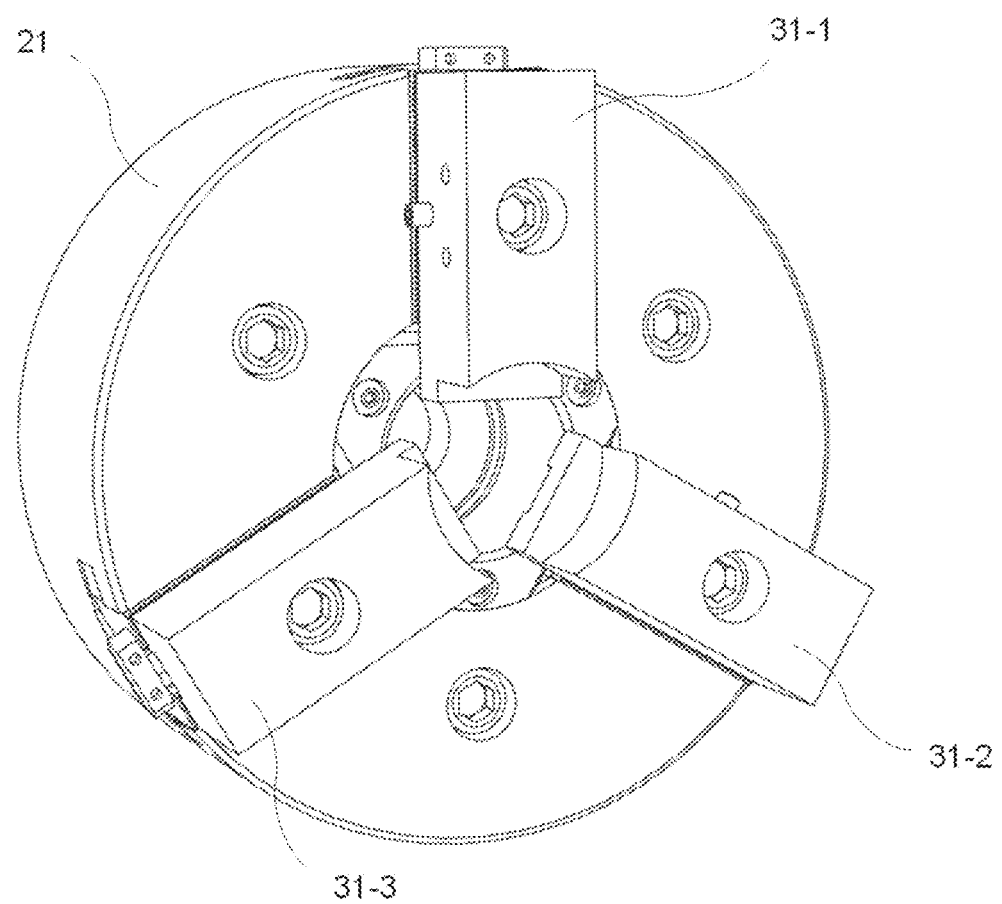
FIG. 2 is a diagram showing an example of a machine tool 2 mounted with a jig 3.
Figure 3A:
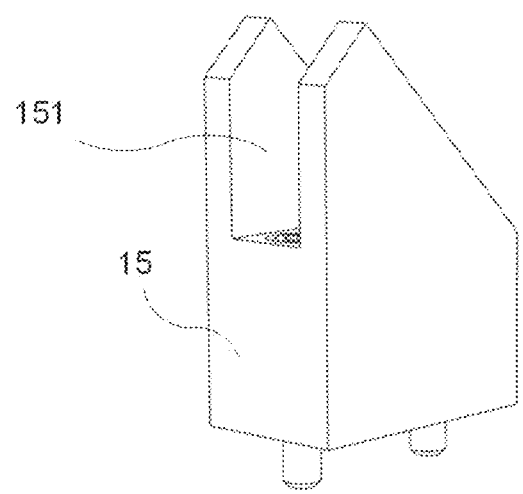
FIG. 3A is a diagram showing a stocker 15 and a replacement jaw 31-1 housed in a stocker 15.
Figure 3B:
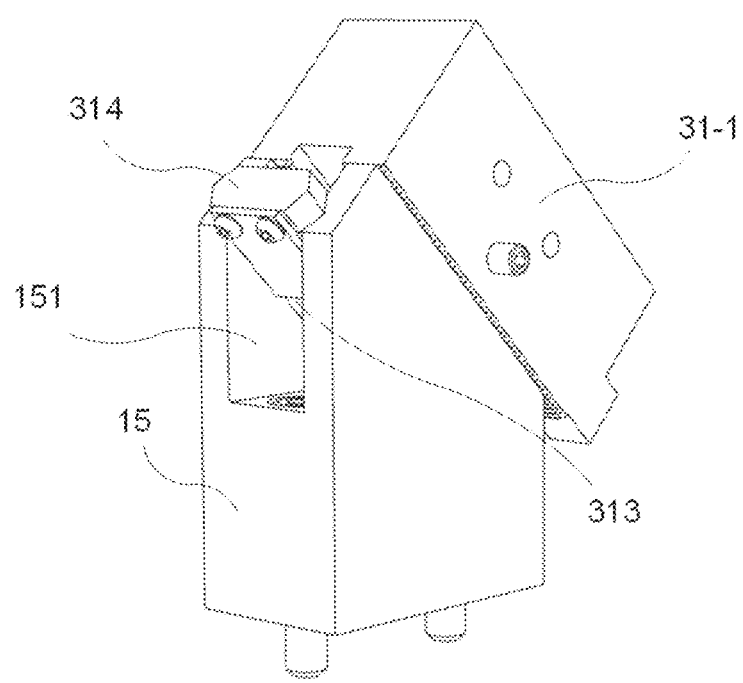
FIG. 3B is a diagram showing a stocker 15 and a replacement jaw 31-1 housed in a stocker 15.

Next, a predetermined portion to be detected by the detection apparatus 12 will be described. FIG. 2 is a diagram showing an example of the machine tool 2 with the jig 3 mounted. A chuck 21 shown in the drawing is a type of the machine tool 2, and a replacement jaw 31-1, a replacement jaw 31-2, and a replacement jaw 31-3 are mounted on the chuck 21 as the jig 3. The replacement jaw 31-1 is housed in the stocker 15, for instance, in the manner shown in FIGS. 3A and 3B. FIGS. 3A and 3B are diagrams showing the stocker 15 and the replacement jaw 31-1 housed in the stocker 15. As shown in FIG. 3A, the stocker 15 includes a groove 151. When the replacement jaw 31-1 is housed in the stocker 15, a T-nut 313 is housed in the groove 151 and a housing position is regulated by a regulating portion 314, as shown in FIG. 3B. The T-nut 313 and the regulating portion 314 will be described later. The replacement jaw may also be referred to as a top jaw.

Figure 4A:
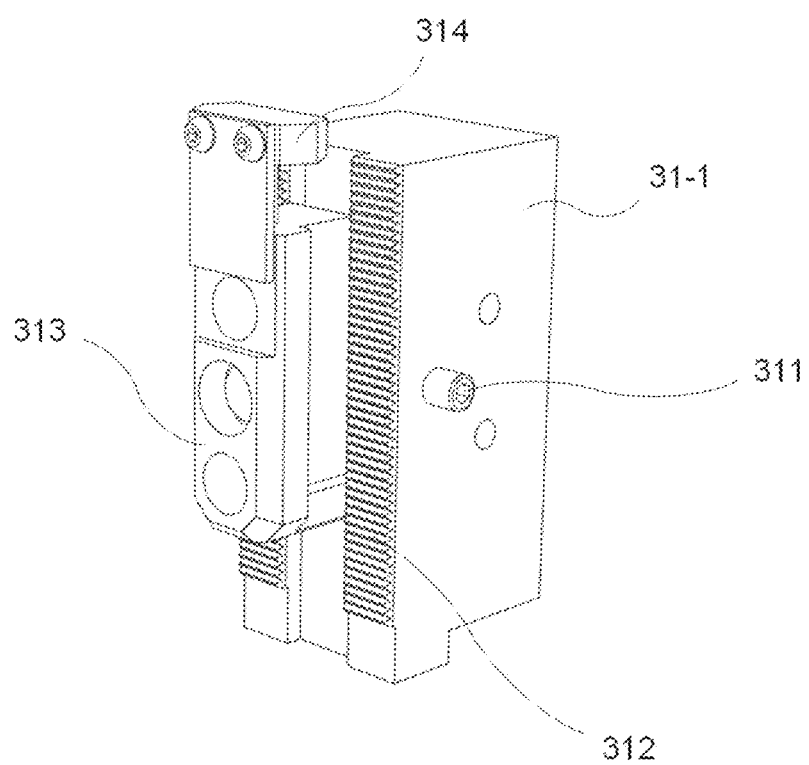
FIG. 4A is a diagram illustrating a replacement jaw 31-1.
Figure 4B:
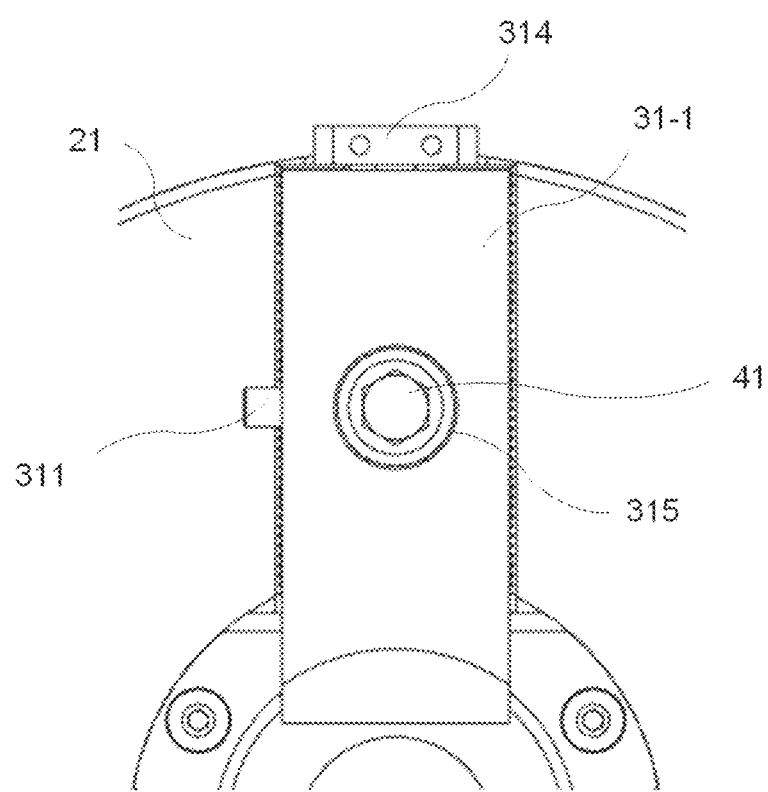
FIG. 4B is a diagram illustrating a replacement jaw 31-1.

Hereinafter, the replacement jaw 31-1 will be illustrated. FIGS. 4A and 4B are diagrams for illustrating the replacement jaw 31-1. As shown in FIG. 4A, the replacement jaw 31-1 includes a convex 311, a serration 312, the T-nut 313, and the regulating portion 314. As shown in FIG. 4B, the replacement jaw 31-1 includes a through hole 315.

The convex 311 is a part of a "locking screw" screwed into a side of the replacement jaw 31-1. The serration 312 is provided on a surface in contact with the replacement jaw 31-1 when the replacement jaw 31-1 is mounted on the chuck 21 or housed in the stocker 15, and when the replacement jaw 31-1 is mounted on the chuck 21, the serration 312 is a portion that abuts so as to mesh with a serration provided on a master jaw on the chuck 21 side. When the replacement jaw 31-1 is housed in the stocker 15, the serration 312 is only in contact with the stocker 15 since the stocker 15 is not provided with serration. Note that the stocker 15 may be provided with serration. The T-nut 313 is a portion that is inserted into a T-groove provided in the master jaw on the chuck 21 side, and is a portion that is housed in the groove 151 when housed in the stocker 15. The regulating portion 314 is a portion that holds a position of the replacement jaw 31-1 even if the robot 13 releases grasp on the replacement jaw 31-1 when the replacement jaw 31-1 is mounted on the chuck 21, and regulates the housing position of the replacement jaw 31-1 when the replacement jaw 31-1 is housed in the stocker 15. The through hole 315 is a hole into which a bolt 41 for fixing the replacement jaw 31-1 is inserted.

For the sake of convenience, assuming that a side of the replacement jaw 31-1 provided with the serration 312 is a back side, and an opposite side thereof is a front side. In this manner, the convex 311 is positioned on a left side of the replacement jaw 31-1.

2-1. Replacement Jaw Side

Figure 5A:
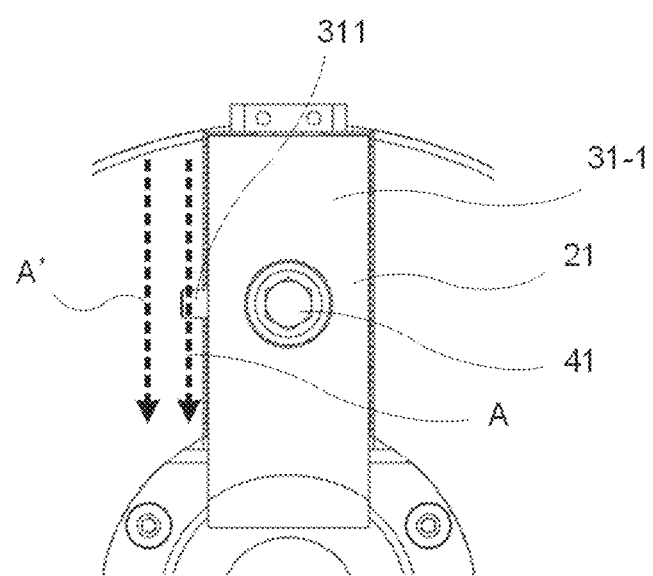
FIG. 5A is a diagram showing a front side of a replacement jaw 31-1 when the replacement jaw 31-1 is mounted on a chuck 21.
Figure 5B:
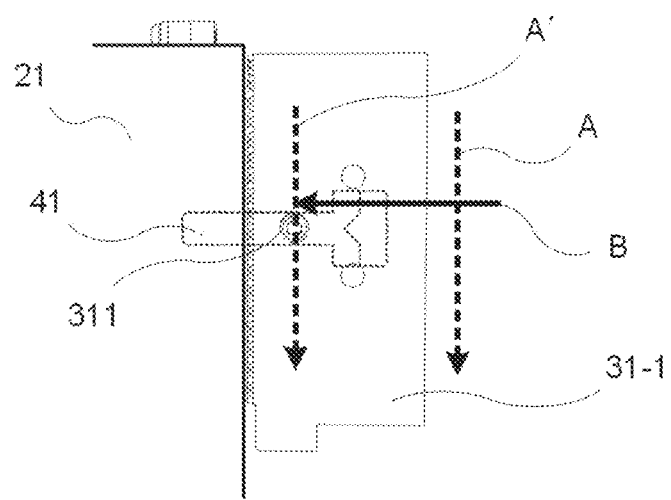
FIG. 5B is a diagram showing a left side of a replacement jaw 31-1 when the replacement jaw 31-1 is mounted on a chuck 21.
Figure 5C:
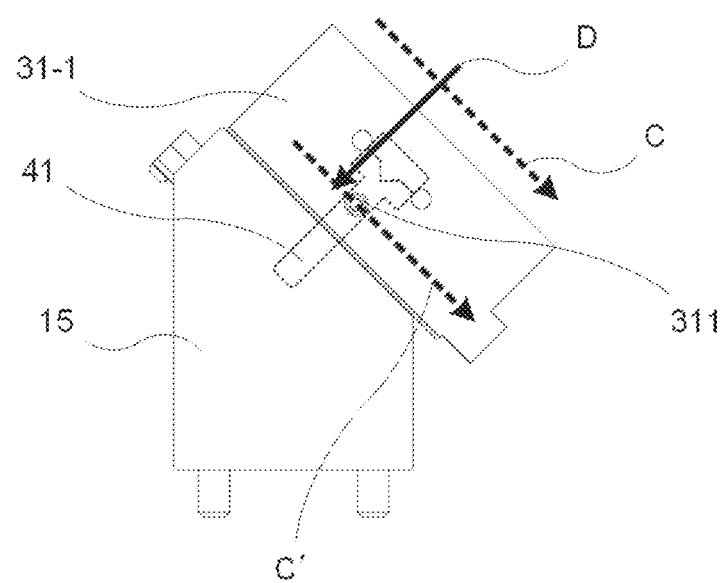
FIG. 5C is a diagram showing a left side of a replacement jaw 31-1 when the replacement jaw 31-1 is housed in a stocker 15.

First, a case where a side of the replacement jaw 31-1 is a predetermined portion will be described. In the case where a side of the replacement jaw 31-1 is set as a predetermined portion, the convex 311 positioned on the left side of the replacement jaw 31-1 is detected. FIGS. 5A to 5C are diagrams showing example of detection when a side of the replacement jaw 31-1 is the predetermined portion. FIG. 5A is a diagram showing a front side of the replacement jaw 31-1 when the replacement jaw 31-1 is mounted on the chuck 21, FIG. 5B is a diagram showing a left side of the replacement jaw 31-1 when the replacement jaw 31-1 is mounted on the chuck 21, and FIG. 5C is a diagram showing a left side of the replacement jaw 31-1 when the replacement jaw 31-1 is housed in the stocker 15. Although the bolt 41 cannot be seen from the left side of the replacement jaw 31-1 shown in FIGS. 5B and 5C, the position of the bolt 41 is indicated by a dashed line for ease of understanding.

When a laser displacement meter is used for the detection apparatus 12, the laser displacement meter scans along arrow A in FIGS. 5A and 5B and irradiates laser in a direction of arrow B in FIG. 5B. The arrow A indicates a range where the convex 311 may exist. Since positions of the convex 311 and the bolt 41 are constant, for instance, the convex 311 is detected in advance when the replacement jaw 31-1 is attached to the chuck 21, and a detection result thereof is stored in association with a tightening/loosening position of the bolt 41, when the laser displacement meter detects the convex 311, a difference between a detected position of the convex 311 and a stored position of the convex 311 is calculated, and by offsetting the stored tightening/loosening position of the bolt 41, the tightening/loosening position of the bolt 41 can be specified. Attachment position of the replacement jaw 31-1 when the position of the convex 311 is stored in advance may be any place within a attachment range. When a proximity sensor is used for the detection apparatus 12, scanning is performed along arrow A' in FIGS. 5A and 5B to detect the convex 311 and specify the position of the bolt 41. When a two-dimensional laser displacement meter is used for the detection apparatus 12, scanning is performed to include an area indicated by the arrow A to detect the convex 311.

If the replacement jaw 31-1 is housed in the stocker 15, the detection apparatus 12 scans along arrow C in FIG. 5C and irradiates laser in a direction of arrow D in FIG. 5C to detect the convex 311 in the same manner to specify the position of the bolt 41. When a proximity sensor is used for the detection apparatus 12, scanning is performed along arrow C' in FIG. 5C to detect the convex 311 and specify the position of the bolt 41.

2-2. T-Nut End Face

Figure 6B:
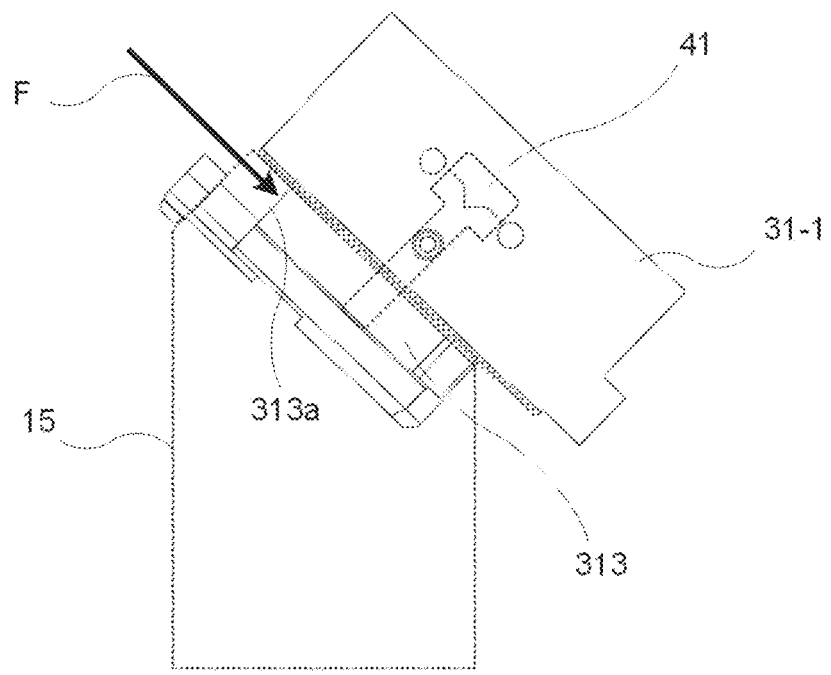
FIG. 6B is a diagram showing a left side of a replacement jaw 31-1 when the replacement jaw 31-1 is housed in a stocker 15.

Next, a case where an end face of the T-nut 313 is used as the predetermined portion will be described. FIGS. 6A and 6B are diagrams showing example of detection when an end face of the T-nut 313 is the predetermined portion. FIG. 6A is a diagram showing a left side of the replacement jaw 31-1 when the replacement jaw 31-1 is mounted on the chuck 21, and FIG. 6B is a diagram sowing a left side of the replacement jaw 31-1 when the replacement jaw 31-1 is housed in the stocker 15. Although the bolt 41 cannot be seen from the left side of the replacement jaw 31-1 shown in FIGS. 6A and 6B, the position of the bolt 41 is indicated by a dashed line for ease of understanding. Further, the chuck 21 and stocker 15 are assumed to be transparent and are shown as dashed lines for ease of understanding.

When a laser displacement meter is used for the detection apparatus 12, laser is irradiated in a direction of arrow E or arrow F shown in FIGS. 6A and 6B. This allows the detection apparatus 12 to detect a position of the T-nut 313. Specifically, since the bolt 41 is screwed with a threaded hole of the T-nut 313, positions of an end face 313a of the T-nut 313 and the bolt 41 are constant. Therefore, for instance, the end face 313a of the T-nut 313 is detected in advance when the replacement jaw 31-1 is attached to the chuck 21, and a detection result thereof is stored in association with the tightening/loosening position of the bolt 41. When the end face 313a is detected by a laser displacement meter, a difference between the detected position of the end face 313a and a stored position of the end face 313a is calculated, and the tightening/loosening position of the bolt 41 can be specified by offsetting the stored tightening/loosening position of the bolt 41 position by the calculated difference. The attachment position of the replacement jaw 31-1 when the position of the end face 313a is stored in advance may be any location within the attachment range.

Figure 7:
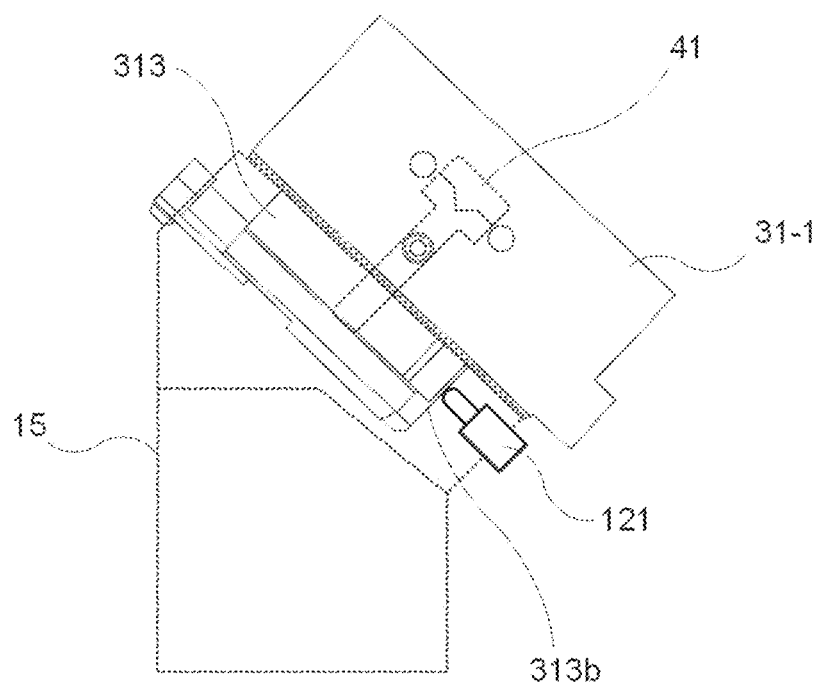
FIG. 7 is a diagram showing an example of detection by a displacement meter when an end face of a T-nut 313 is set as a predetermined portion.

FIG. 7 is a diagram showing an example of detection when an end face of the T-nut 313 is set as a predetermined portion by a displacement meter. In FIG. 7, the stocker 15 is assumed to be transparent for ease of understanding, and is indicated by a dashed line. A displacement meter 121 shown in FIG. 7 is arranged in the stocker 15. The displacement meter 121 contacts an end face 313b of the T-nut 313 when the replacement jaw 31-1 is housed in the stocker 15, and detects a position of the end face 313b of the T-nut 313. With such a configuration, the position of the bolt 41 can be specified by detecting the position of the end face 313b of the T-nut 313 with the displacement meter 121.

2-3. Tool Hole of Bolt

Figure 8A:
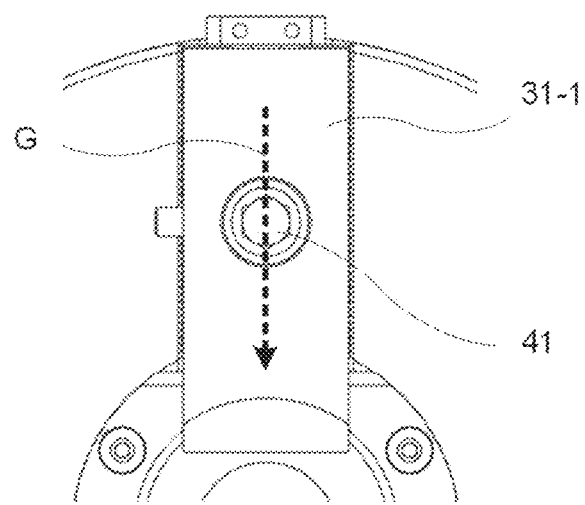
FIG. 8A is a diagram showing a front side of a replacement jaw 31-1 when the replacement jaw 31-1 is mounted on a chuck 21.

Next, a case where a tool hole of the bolt 41 is set as a predetermined portion will be described. FIGS. 8A and 8B are diagrams showing example of detection when the tool hole of the bolt 41 is set as a predetermined portion. FIG. 8A is a diagram showing a front side of the replacement jaw 31-1 when the replacement jaw 31-1 is mounted on the chuck 21, and FIG. 8B is a diagram showing a left side of the replacement jaw 31 when the replacement jaw 31-1 is mounted on the chuck 21. In FIG. 8B, for ease of understanding, the chuck 21 is assumed to be transparent and is indicated by a dashed line.

If a laser displacement meter is used for the detection apparatus 12, the laser displacement meter scans along arrow G in FIGS. 8A and 8B and irradiates laser in a direction of arrow H in FIG. 8B. Arrow G indicates a range where the bolt 41 may exist. When a two-dimensional laser displacement meter is used for the detection apparatus 12, scanning is performed to include an area indicated by arrow G to detect the tool hole of the bolt 41. Specifically, an area around the tool hole of the bolt 41 is scanned in advance and a distance between bottom of the tool hole and an area around is stored as a pattern, and a detected change in distance is compared with the stored pattern to determine whether it is the tool hole of the bolt 41. When a proximity sensor is used to detect the tool hole of the bolt 41, it detects directly. When a camera is used to detect the tool hole of the bolt 41, imaging is performed in such a manner that the range where the tool hole of the bolt 41 may exist is included in an imaging range. When a three-dimensional scanner is used to detect the tool hole of the bolt 41, scanning is performed in such a manner that the range where the tool hole of the bolt 41 may exist is included in a scanning area.

Similarly, when the replacement jaw 31-1 is housed in the stocker 15, the tool hole of the bolt 41 is detected by scanning a range in front of the replacement jaw 31-1 where the bolt 41 may exist.

Figure 9:
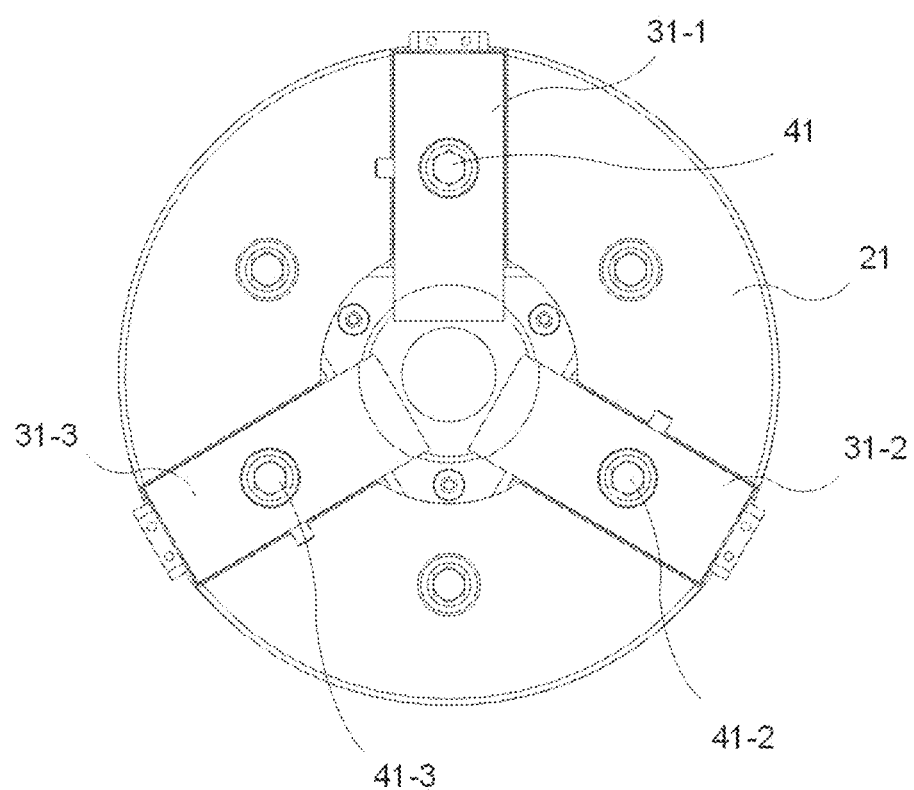
FIG. 9 is a diagram showing an example of detection when a camera is used as a detection apparatus 12.

When a camera is used for the detection apparatus 12, a range in which the bolt 41 may exist in front of the replacement jaw 31-1 is photographed, and the tool hole of the bolt 41 is detected by image processing. Further, when the replacement jaw 31-1 is mounted on the chuck 21, as shown in FIG. 9, imaging range by the camera is set to include an entire front of the chuck 21, thus in addition to the bolt 41 of the replacement jaw 31-1, a bolt 41-2 of the replacement jaw 31-2, and a bolt 41-3 of the replacement jaw 31-3 can be photographed at the same time. FIG. 9 is a diagram showing an example of detection when a camera is used for the detection apparatus 12. When the imaging range by the camera is set to include the entire front of the chuck 21, a bolt that fixes the chuck itself as well as the bolt 41, the bolt 41-2, and the bolt 41-3 is captured as well, however in this case, contours of the replacement jaw 31-1, the replacement jaw 31-2, and the replacement jaw 31-3 are detected by image processing, and what is inside the contours is determined as a target for detecting the tool hole. Specifically, the tool hole specified from an image taken in advance when the replacement jaw 31-1 is attached to the chuck 21 is stored in association with the tightening/loosening position of the bolt 41, and based on this, the tightening/loosening position of the bolt 41 is specified from the detected tool hole. Although an attachment position of the replacement jaw 31-1 when photographed and stored in advance may be any location within the attachment range, by storing two or more images of different attachment positions, etc. and the tightening/loosening position of the bolt 41 associated with each image facilitates conversion of orientation and scale through image processing, hence improves accuracy of specifying the tightening/loosening position of the bolt 41.

2-4. Bolt Head

A bolt may not have a tool hole. In this case, a head of the bolt is detected. Since detection of a bolt head is the same as the detection of the tool hole of the bolt 41, detailed description thereof will be omitted.

3. Operation Example

Next, an operation example of the automatic jig replacement system 1 will be described.

3-1. When Mounting a Set of Replacement Jaws to Chuck

Figure 10:
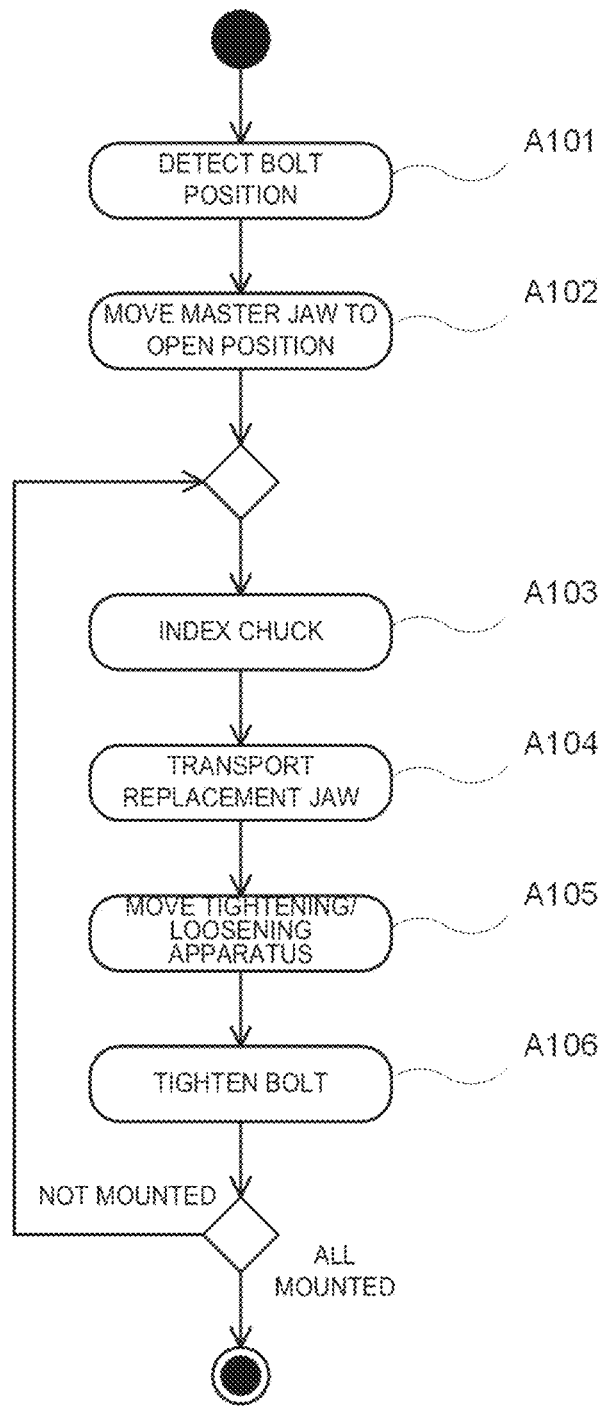
FIG. 10 is an activity diagram showing a flow of operation when mounting a replacement jaw to a chuck.

FIG. 10 is an activity diagram showing a flow of operation when mounting a replacement jaw to a chuck. First, the detection apparatus 12 detects a position of the bolt 41 of the replacement jaw 31-1, which is housed in the stocker 15 (A101). Subsequently, if the master jaw is not at an open position, a control apparatus of the chuck 21 drives a cylinder (not shown) to allow all the master jaws to move to the open position (A102).

Next, a control apparatus of the machine tool allows a spindle on which the chuck 21 is attached to operate to index a position of the master jaw to which the replacement jaw 31-1 is mounted on a predetermined position (A103). The predetermined position is, for instance, a position indicating 12 o'clock on a clock. The robot 13 then transports the replacement jaw 31-1 from the stocker 15 to the predetermined position of the master jaw, which is a mounting position (A104). Then, based on the bolt position detected in A101, the bolt tightening/loosening apparatus 14 is allowed to move to a position of the bolt 41 (A105). Since the bolt position detected in A101 is the position of the bolt 41 with respect to the replacement jaw 31-1, the position of the bolt 41 can be specified from the position and a position at which the replacement jaw 31-1 is transported. Then, the bolt tightening/loosening apparatus 14 tightens the bolt 41 (A106).

Similarly, the control apparatus of the machine tool allows the spindle on which the chuck 21 is attached to operate to index the position of the master jaw on which the replacement jaw 31-2 is mounted on a predetermined position (A103). The robot 13 then transports the replacement jaw 31-2 from the stocker 15 to the predetermined position of the master jaw, which is the mounting position (A104). Then, based on the bolt position detected in A101, the bolt tightening/loosening apparatus 14 is allowed to move to a position of the bolt 41-2 (A105). The bolt tightening/loosening apparatus 14 then tightens the bolt 41-2 (A106).

Furthermore, the control apparatus of the machine tool allows the spindle on which the chuck 21 is attached to operate to index the position of the master jaw on which the replacement jaw 31-3 is mounted on a predetermined position (A103). The robot 13 then transports the replacement jaw 31-3 from the stocker 15 to the predetermined position of the master jaw, which is the mounting position (A104). Then, based on the bolt position detected in A101, the bolt tightening/loosening apparatus 14 is allowed to move to a position of the bolt 41-3 (A105). The bolt tightening/loosening apparatus 14 then tightens the bolt 41-3 (A106).

When the replacement jaw 31-1, the replacement jaw 31-2, and the replacement jaw 31-3 are mounted on the chuck 21, the mounting of the set of replacement jaws on the chuck 21 is completed.

Since bolt positions of all replacement jaws are the same in most cases, the bolt position is detected only once, but the bolt positions of all replacement jaws may be detected as well.

3-2. When Housing a Set of Replacement Jaws in Stocker

Figure 11:
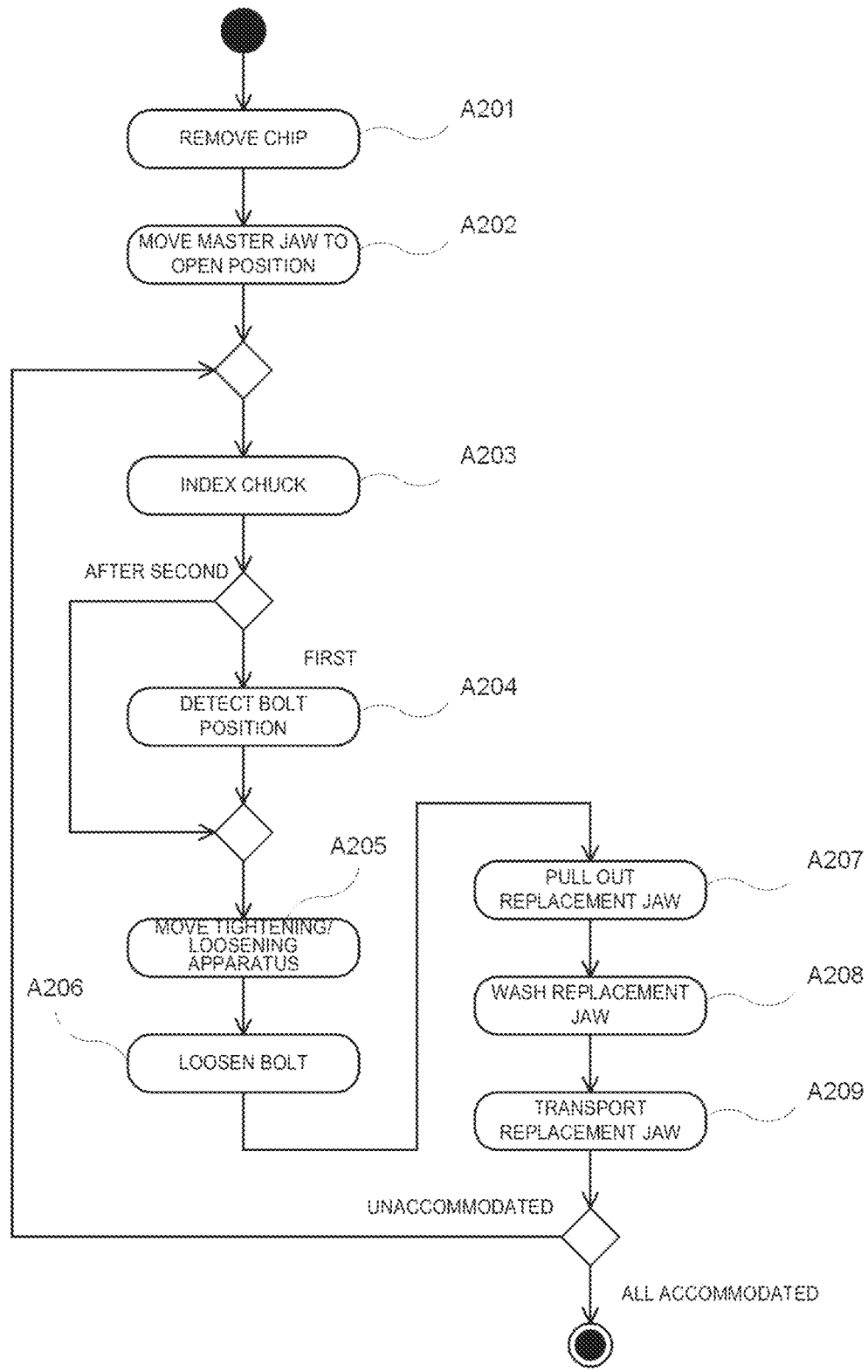
FIG. 11 is an activity diagram showing a flow of operation when a replacement jaw is housed in a stocker.

FIG. 11 is an activity diagram showing a flow of operation when the replacement jaw is housed in the stocker. First, the robot 13 removes chip from a surface of the chuck 21 using air blow or other means (A201). Subsequently, if the master jaw is not at an open position, the control apparatus of the chuck 21 drives a cylinder (not shown) to allow all the master jaws to move to the open position (A202).

Next, the control apparatus of the machine tool allows a spindle on which the chuck 21 is attached to operate to index the position of the master jaw on which the replacement jaw 31-1 is mounted on a predetermined position (A203). The predetermined position is, for example, a position indicating 12 o'clock on a clock. Then, the detection apparatus 12 detects the position of the bolt 41 of the replacement jaw 31-1 (A204). However, if the replacement jaw 31-1 (the replacement jaw 31-2, the replacement jaw 31-3) mounted on the chuck 21 are the same as when they were mounted, such a process can be omitted because the tightening/loosening position is the same as when they were mounted.

Subsequently, based on the bolt position detected in A204, the bolt tightening/loosening apparatus 14 is allowed to move to the position of the bolt 41 (A205), and the bolt tightening/loosening apparatus 14 loosens the bolt 41 (A206). Then, the robot 13 pulls out the replacement jaw 31-1 from the master jaw (A207), and transports the removed replacement jaw 31-1 to a washing position for washing (A208). When washing is completed, the robot 13 transports replacement jaw 31-1 to a housing position of the stocker 15 (A209).

Similarly, the control apparatus of the machine tool allows the spindle on which the chuck 21 is attached to operate to index the position of the master jaw on which the replacement jaw 31-2 is mounted on a predetermined position (A203). Then, based on the bolt position detected in A204, the bolt tightening/loosening apparatus 14 is allowed to move to the position of the bolt 41-2 (A205), and the bolt tightening/loosening apparatus 14 loosens the bolt 41-2 (A206). Then, the robot 13 pulls out the replacement jaw 31-2 from the master jaw (A207), and transports the removed replacement jaw 31-2 to the washing position for washing (A208). When washing is completed, the robot 13 transports the replacement jaw 31-2 to the housing position of the stocker 15 (A209).

Furthermore, the control apparatus of the machine tool allows the spindle on which the chuck 21 is attached to operate to index the position of the master jaw on which the replacement jaw 31-3 is mounted on a predetermined position (A203). Then, based on the bolt position detected in A204, the bolt tightening/loosening apparatus 14 is allowed to move to the position of the bolt 41-3 (A205), and the bolt tightening/loosening apparatus 14 loosens the bolt 41-3 (A206). Then, the robot 13 pulls out the replacement jaw 31-3 from the master jaw (A207), and transports the removed replacement jaw 31-3 to the washing position for washing (A208). When washing is completed, the robot 13 transports the replacement jaw 31-3 to the housing position of the stocker 15 (A209).

Since bolt positions of all replacement jaws are the same in most cases, the bolt position is detected only once, but the bolt positions of all replacement jaws may be detected as well. Further, it is not necessary to wash the replacement jaws one by one in order, and a flow may be adopted in which all the replacement jaws are transported to the washing position and collectively cleaned, and then transported to the housing position after washing.

3-3. Variation when Housing a Set of Replacement Jaws in Stocker

The automatic jig replacement system 1 may be configured in such a manner that the detection apparatus 12 and the bolt tightening/loosening apparatus 14 are comprised in the robot 13, or may be configured in such a manner that the detection apparatus 12, the robot 13, and the bolt tightening/loosening apparatus 14 operate independently. In this case, the detection apparatus 12, the robot 13, and the bolt tightening/loosening apparatus 14 may be allowed to operate in parallel. Hereinafter, an example of operation when the robot 13 and the bolt tightening/loosening apparatus 14 are allowed to operate in parallel will be described.

Figure 12:
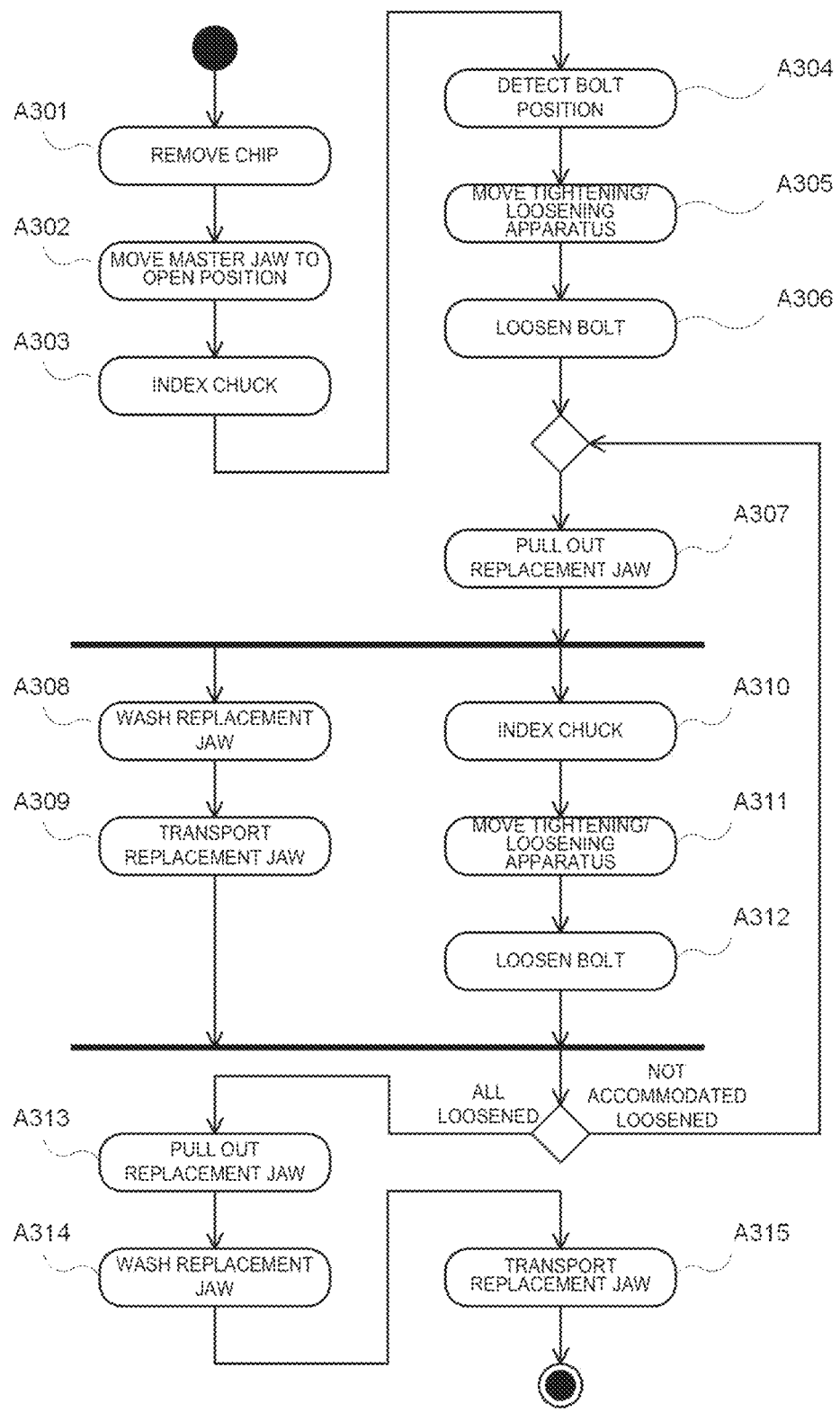
FIG. 12 is an activity diagram showing a flow of operation when a replacement jaw is housed in a stocker.

FIG. 12 is an activity diagram showing a flow of operation when a replacement jaw is housed in a stocker. First, the robot 13 removes chip from a surface of the chuck 21 using air blow or other means (A301). Then, if the master jaw is not at an open position, the control apparatus of the chuck 21 drives a cylinder (not shown) to move all the master jaws to the open position (A302).

Next, the control apparatus of the machine tool allows a spindle on which the chuck 21 is attached to operate to index the position of the master jaw on which the replacement jaw 31-1 is mounted on a predetermined position (A303). The predetermined position is, for example, a position indicating 12 o'clock on a clock. The detection apparatus 12 then detects the position of the bolt 41 of the replacement jaw 31-1 (A304).

Then, based on the bolt position detected in A304, the bolt tightening/loosening apparatus 14 is allowed to move to the position of the bolt 41 (A305), and the bolt tightening/loosening apparatus 14 loosens the bolt 41 (A306). Then, the robot 13 pulls out the replacement jaw 31-1 from the master jaw (A307).

Next, the robot 13 transports the removed replacement jaw 31-1 to a washing position for washing (A308). When washing is completed, the robot 13 transports the replacement jaw 31-1 to a housing position of the stocker 15 (A309).

On the other hand, while the robot 13 is processing A308 and A309, the control apparatus of the machine tool allows the spindle on which chuck 21 is attached to operate to index the position of the master jaw on which the replacement jaw 31-2 is mounted on a predetermined position (A310). Based on the bolt position detected in A304, the bolt tightening/loosening apparatus 14 is allowed to move to the position of the bolt 41 (A311), and the bolt tightening/loosening apparatus 14 loosens the bolt 41 (A312).

After processing of A309 by the robot 13 and processing of A312 by the bolt tightening/loosening apparatus 14 are completed, the robot 13 pulls out the replacement jaw 31-2 from the master jaw (A307).

Similarly, the robot 13 transports the removed replacement jaw 31-2 to the washing position for washing (A308), and when washing is completed, the robot 13 transports the replacement jaw 31-2 to the housing position of the stocker 15 (A309). At this time, the control apparatus of the machine tool allows the spindle on which the chuck 21 is attached to operate to index the position of the master jaw on which the replacement jaw 31-3 is mounted on a predetermined position (A310). Based on the bolt position detected in A304, the bolt tightening/loosening apparatus 14 is allowed to move to the position of the bolt 41 (A311), and the bolt tightening/loosening apparatus 14 loosens the bolt 41 (A312).

The robot 13 then pulls out the replacement jaw 31-3 from the master jaw (A313), and the robot 13 transports the removed replacement jaw 31-3 to a washing position for washing (A314). When washing is completed, the robot 13 transports the replacement jaw 31-3 to a housing position of the stocker 15 (A315).

4. Other

So far, although a combination of the machine tool 2 and the jig 3, the chuck 21 and the replacement jaw 31-1, etc. have been described as example, even if the machine tool 2 and the jig 3 are in different forms, the jig 3 can be replacement by the automatic jig replacement system 1. Hereinafter, an example of a vise-type jig will be described.

Figure 13:
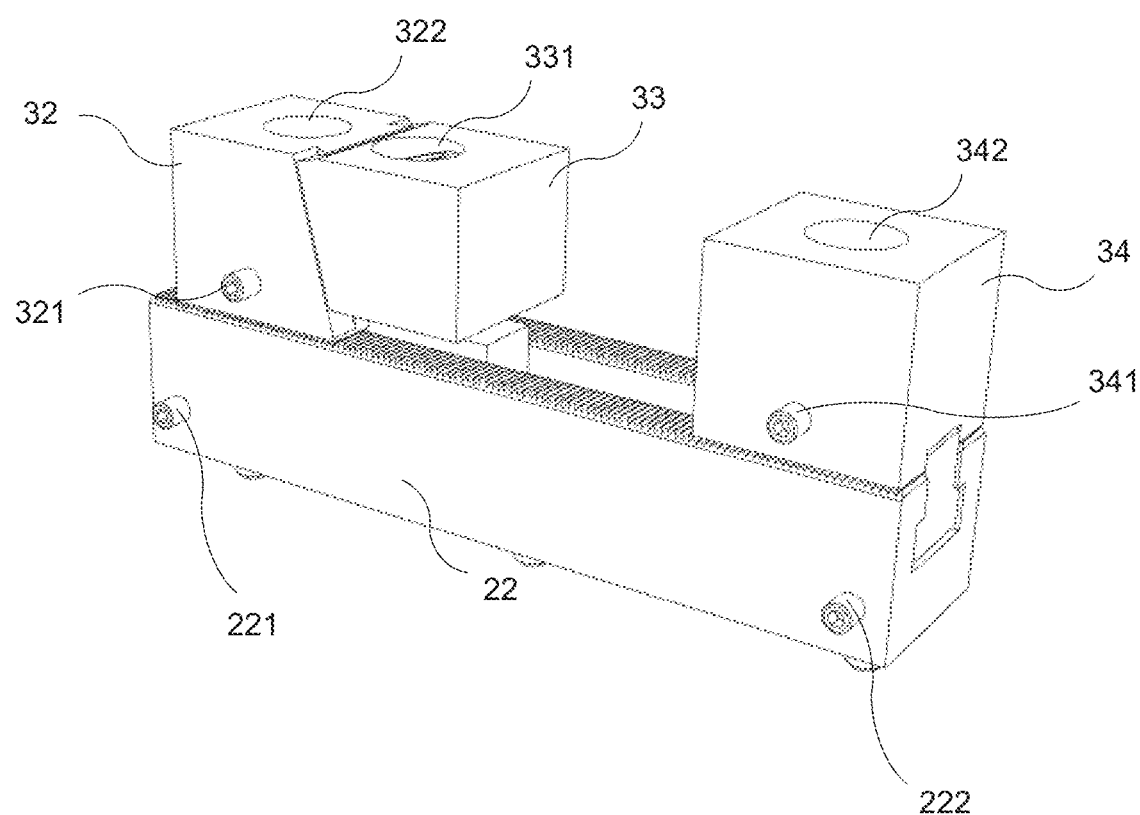
FIG. 13 is a diagram showing a vise-type jig.

FIG. 13 is a diagram showing a vise-type jig. In an example shown in the drawing, a fixing portion 32 of a gripping jaw, a movable portion 33 of a gripping jaw, and a fixing jaw 34 are mounted on a jig body 22. In this example, the fixing portion 32, the movable portion 33, and the fixing jaw 34 can be replaced. When the automatic jig replacement system 1 performs such replacement, although it is necessary to detect a position of a bolt or other fixture, the detection is performed by detecting a position of a convex 321 of the fixing portion 32 or a convex part 341 of the fixing jaw 34 with respect to a convex 221 or a convex 222 of the jig body 22. Further, detection of a bolt in a through hole 322 of the fixing portion 32, a bolt in a through hole 331 of the movable portion 33, and a bolt in a through hole 342 of the fixing jaw 34 can be performed in the same manner as described previously.

The jig shown in FIG. 13 is of a type capable of gripping a workpiece by tightening/loosening a bolt. Therefore, it is possible to grip a workpiece and release the grip by the same method as replacement of a jig by specifying a position to tighten/loosen a bolt and tightening/loosening the bolt. Therefore, when using the jig shown in FIG. 13 or a jig of the same type, replacement of workpiece can be performed automatically.

The present invention may be provided in each of the following aspects.

The automatic jig replacement system, further comprising: a stocker configured to house the jig, wherein the robot is configured to carry the jig out of the mounting position to a housing position provided on the stocker, or to carry the jig from the housing position into the mounting position.

The automatic jig replacement system, wherein: the detection apparatus is comprised in at least one of the stocker and the machine tool.

The automatic jig replacement system, wherein: the detection apparatus is comprised in the robot.

The automatic jig replacement system, wherein: the bolt tightening/loosening apparatus is integrally comprised in the robot.

The automatic jig replacement system, wherein: the predetermined portion is an end face of a T-nut comprised in the jig, and the detection apparatus is a displacement meter or a laser displacement meter that detects a position of the T-nut.

The automatic jig replacement system, wherein: the predetermined portion is a convex or concave provided on a side of the jig, and the detection apparatus is any one of a laser displacement meter, a two-dimensional laser displacement meter, and a proximity sensor that detects a position of the convex or the concave.

The automatic jig replacement system, wherein: the predetermined portion is a tool hole for tightening/loosening provided in a bolt that tightens the jig, and the detection apparatus is any one of a laser displacement meter, a two-dimensional laser displacement meter, a camera, and a three-dimensional scanner that detects a position of the tool hole.

The automatic jig replacement system, wherein: the predetermined portion is a head of a bolt that tightens the jig, and the detection apparatus is any one of a laser displacement meter, a two-dimensional laser displacement meter, a camera, and a three-dimensional scanner that detects a position of the head.

The automatic jig replacement system, wherein: the machine tool is a chuck, and the chuck is configured in such a manner that at least a top jaw is mounted as a jig on a master jaw that is provided on the chuck.

The automatic jig replacement system, wherein: the machine tool is a fixture that is fixed to a machining center or a 5-axis machine, and the fixture is configured in such a manner that at least a top jaw is mounted as a jig.

Of course, the present invention is not limited to the above aspects.

Finally, various embodiments of the present invention have been described, but these are presented as examples and are not intended to limit the scope of the invention. The novel embodiment can be implemented in various other forms, and various omissions, replacements, and changes can be made without departing from the abstract of the invention. The embodiment and its modifications are included in the scope and abstract of the invention and are included in the scope of the invention described in the claims and the equivalent scope thereof.

REFERENCE SIGNS LIST

1: Automatic jig replacement system
2: Machine tool
3: Jig
11: Control apparatus
12: Detection apparatus
13: Robot
14: Bolt tightening/loosening apparatus
15 Stocker
21: Chuck
22: Jig body
31-1: Replacement jaw
31-2: Replacement jaw
31-3: Replacement jaw
32: Fixing portion
33: Movable portion
34: Fixing jaw
41: Bolt
41-2: Bolt
41-3: Bolt
121: Displacement meter
151: Groove
221: Convex
222: Convex
311: Convex
312: Serration
313: T-nut
313a: End face
313b: End face
314: Regulating portion
315: Through hole
321: Convex
322: Through hole
331: Through hole
341: Convex
342: Through hole
A: Arrow
B: Arrow
C: Arrow
D: Arrow
G: Arrow
H: Arrow

What is claimed is:

1. An automatic jig replacement system automatically replacing a jig that is mounted on a mounting position of a machine tool by bolt tightening/loosening, the system comprising a detection apparatus, a robot, a bolt tightening/loosening apparatus, and a control apparatus, wherein:

the detection apparatus configured to detect a predetermined portion of the jig, a position of the predetermined portion of the jig being stored in association with a tightening/loosening position of a bolt;

the robot configured to transport the jig;

the bolt tightening/loosening apparatus configured to tighten/loosen a bolt that fixes the jig; and the control apparatus configured to determine a bolt tightening/loosening position of the jig based on a detection result of the predetermined portion of the jig by the detection apparatus, allow the robot to carry the jig out of the mounting position or to carry the jig into the mounting position, and allow the bolt tightening/loosening apparatus to move to the bolt tightening/loosening position, and allow the bolt tightening/loosening apparatus to perform tightening/loosening of the bolt.

2. The automatic jig replacement system according to claim 1, further comprising:

a stocker configured to house the jig, wherein the robot is configured to carry the jig out of the mounting position to a housing position provided on the stocker, or to carry the jig from the housing position into the mounting position.

3. The automatic jig replacement system according to claim 2, wherein:

the detection apparatus is comprised in at least one of the stocker and the machine tool.

4. The automatic jig replacement system according to claim 1, wherein:

the detection apparatus is comprised in the robot.

5. The automatic jig replacement system according to claim 1, wherein:

the bolt tightening/loosening apparatus is integrally comprised in the robot.

6. The automatic jig replacement system according to claim 1, wherein:

the predetermined portion is an end face of a T-nut comprised in the jig, and the detection apparatus is a displacement meter or a laser displacement meter that detects a position of the T-nut.

7. The automatic jig replacement system according to claim 6, wherein:

the machine tool is a chuck, and the chuck is configured in such a manner that at least a top jaw is mounted as a jig on a master jaw that is provided on the chuck.

8. The automatic jig replacement system according to claim 6, wherein:

the machine tool is a fixture that is fixed to a machining center or a 5-axis machine, and the fixture is configured in such a manner that at least a top jaw is mounted as a jig.

9. The automatic jig replacement system according to claim 1, wherein:

the predetermined portion is a convex or concave provided on a side of the jig, and the detection apparatus is any one of a laser displacement meter, a two-dimensional laser displacement meter, and a proximity sensor that detects a position of the convex or the concave.

10. The automatic jig replacement system according to claim 1, wherein:

the predetermined portion is a tool hole for tightening/loosening provided in a bolt that tightens the jig, and the detection apparatus is any one of a laser displacement meter, a two-dimensional laser displacement meter, a camera, and a three-dimensional scanner that detects a position of the tool hole.

11. The automatic jig replacement system according to claim 1, wherein:

the predetermined portion is a head of a bolt that tightens the jig, and the detection apparatus is any one of a laser displacement meter, a two-dimensional laser displacement meter, a camera, and a three-dimensional scanner that detects a position of the head.

* * * * *